(12) United States Patent
Adrian (10) Patent No.: US 10,367,803 B2
(45) Date of Patent: Jul. 30, 2019

(54) MANAGED OPEN SOURCE MEDICAL DEVICES (71) Applicant: Gropper Adrian, Watertown, MA (US)

(72) Inventor: Gropper Adrian, Watertown, MA (US)

(*) Notice: Subject to any disclaimer, the term of this patent is extended or adjusted under 35 U.S.C. 154(b) by 221 days.

(21) Appl. No.: 15/097,249

(22) Filed: Apr. 12, 2016

(65) Prior Publication Data
US 2016/0366112 A1 Dec. 15, 2016

Related U.S. Application Data (60) Provisional application No. 62/146,387, filed on Apr. 12, 2015.

(51) Int. Cl.
H04L 9/00 (2006.01)
H04L 29/06 (2006.01)

(52) U.S. Cl.
CPC ........ *H04L 63/0823* (2013.01); *H04L 63/126* (2013.01)

(58) Field of Classification Search
CPC .......................... H04L 63/0823; H04L 63/126
See application file for complete search history.

(56) References Cited

U.S. PATENT DOCUMENTS

| 5,844,986 | A | * | 12/1998 | Davis | G06F 21/572 713/187 |
| 7,448,080 | B2 | * | 11/2008 | Karjala | H04L 41/0806 379/901 |
| 8,296,561 | B2 | * | 10/2012 | Kanemura | G06F 21/10 713/155 |
| 8,972,591 | B2 | * | 3/2015 | Baba | H04L 9/3263 709/223 |
| 2013/0042117 | A1 | * | 2/2013 | Birtwhistle | H04L 9/3268 713/182 |

* cited by examiner

Primary Examiner — Beemnet W Dada
(74) Attorney, Agent, or Firm — Kristofer E. Elbing (57) ABSTRACT This document discusses designing and managing medical devices that are equipped with software, including a variety of ways of managing the public interest in safety and effectiveness of medical devices that are preferably implemented with open-source software. In one general aspect, a method of updating a medical device is disclosed. The method includes storing a vendor certificate in the device, and receiving and storing a licensed prescriber certificate in the device. A signed request to update code in the medical device can then be received and this request can be authenticated with one of the certificates, and the code can be updated in the medical device with code from the authenticated update request.

14 Claims, 7 Drawing Sheets

MANAGED OPEN SOURCE MEDICAL DEVICES

CROSS-REFERENCE TO RELATED APPLICATION

This application claims the benefit under 35 U.S.C. 119(e) of U.S. provisional application Ser. No. 62/146,387, which is herein incorporated by reference.

FIELD OF THE INVENTION

The present invention relates to the field of upgradeable information processing devices, including devices and methods for the management of software in connected medical devices.

BACKGROUND OF THE INVENTION

The Internet of Things or IoT is a vague term commonly applied to devices that combine hardware, software, and connectivity to a network, including a public network such as the Internet. The connectivity adds value but it also brings risks of security breaches and unintended behaviors which are often difficult to anticipate at the time of manufacture and installation of the device. Therefore, it is important to provide a means to audit the software of a device and update it as exploits become known. The audit should cover multiple aspects controlling device integrity including, but not restricted to: unintentional changes to the software, hidden or latent behaviors such as malicious communications or denial of service, as well as intentional changes that violate the terms of use associated with the device.

Periodic updates are a common feature of today's connected devices such as smartphones. More sophisticated devices such as an Apple iPhone model 6 include secure hardware elements designed to link update procedures to a vendor's authorized processes. These features are described in publications such as Apple Inc.'s iOS_Security_Guide_Sept_2014 http://ss1.apple.com/privacy/docs/iOS_Security_Guide_Sept_2014.pdf and incorporated herein by reference. Apple's approach is not designed to easily accommodate modifications to the software without permission from Apple.

Open source software promotes peer review, community support, and facilitates innovation. However, open source software also shifts responsibility away from the device vendor, leading to potential security and trust concerns. Variations on the theme of managing the integrity of software are well known to those skilled in the art. For example, the widely deployed Unified Extensible Firmware Interface or UEFI describes the practice of securing one or more public keys in the hardware and signing software with the corresponding vendor's private key. Restriction on software modification is a concern to the open source community and variations in the practice of hardware vendors have been described and adopted http://en.wikipedia.org/wiki/Unified_Extensible_Firmware_Interface#Secure_boot_criticism.

A third example of secure hardware devices is a secure element with a private key and the ability to sign external challenges. Fast IDentity Online or FIDO http://en.wikipedia.org/wiki/FIDO_Alliance enables a single device to be registered and linked to an unlimited number of servers. The FIDO device includes a vendor's public certificate to prove integrity and a mechanism for user control to prevent unauthorized use or impersonation. Apple, UEFI, and FIDO are examples of trust models focused on the device vendor.

A fourth example of secure devices is protection on the basis of multiple signatures. In particular, Bitcoin multisig https://coincenter.org/2015/01/multi-sig/ is able to distribute responsibility for a secure transaction among multiple parties. Multisig can be used to distribute responsibility and introduce desirable redundancy in the trust model among multiple parties including one or more vendors, licensed prescribers, and patients. In this example the vendor is only one of many votes and no longer has veto power over device updates.

Regulated medical devices are also party to the Internet of Things. Agencies such as the US Food and Drug Administration (FDA) review applications by device vendors for safety and effectiveness relative to the stated Indications for Use of the device. The Indications for Use may restrict use through prescription by a licensed professional such as a physician.

SUMMARY OF THE INVENTION

In one general aspect, the invention features a medical device that includes a processor for running software code, a field-upgradable code storage medium for storing code to be run by the processor, and a network interface to enable updates to the code in the a field-upgradable code storage medium. Also included is a secure element, that includes code digest code operative to calculate a mathematical digest of code including field upgradable code, key storage for holding multiple public key certificates, and verification code for verifying that the code digest has been signed by at least one key associated with the stored certificates prior to accepting an upgrade. One or more medical transducers interact with the patient and are responsive to the code in the code store.

In preferred embodiments, the transducers can include an effector, such as a glucose pump. The device can further include code to add or delete public key certificates under control of existing certificates. The device can also further include code to require M of N defined custodian certificates to add a certificate, where M is at least two and smaller than or equal to N. The medical device can be a regulated medical device and the key storage can include a certificate corresponding to a professional licensing board. The key storage can also include a certificate for at least one vendor, one physician, one patient, and/or one community. A companion application can be provided with connectivity to both the medical device with the secure element and a management server for that medical device. A companion application can also provide a user interface to facilitate update of the medical device. And it can include code to register with a management server using secrets in both its own secure element and the secure element of the medical device. The companion application can be a smartphone application running on a smartphone connected to the medical device via an interface. The code digest code and the verification code can be open-source code.

In another general aspect, the invention features a method of updating a medical device that includes storing a vendor certificate in the medical device, receiving a licensed prescriber certificate in the medical device, storing the licensed prescriber certificate in the medical device, receiving a signed request to update code in the medical device, authenticating the signed update request with one of the prescriber and vendor certificates, and updating the code in the medical device with code from the authenticated update request.

In preferred embodiments, the method can further include storing a patient certificate in the medical device and the step of authenticating the prescriber certificate based on the patient certificate. The method can further include the step of authenticating the licensed prescriber certificate in the medical device based on the vendor certificate. The steps of receiving a signed request to update code in the medical device can receive an update from a registered update service. The method can further include storing a patient certificate in the medical device based on the prescriber certificate. The step of authenticating the signed update requests can be performed by at least two of three certificate holders including the vendor, prescriber, and patient. The method can further include removing one of the certificates to transfer control of the device.

The public interest in safety and effectiveness of medical devices can be managed through a combination of two regulatory mechanisms: centralized vendor regulation and distributed licensing of prescribers. Embodiments of the present invention can improve the means by which connected medical devices can be regulated as a balance between vendor regulation and prescriber initiative. Medical devices are often a combination of hardware and software. The software may be subject to regulatory controls and may need to be updated after the device is in service. Devices based on open source software are desirable because they encourage peer review and public disclosure of flaws. As such, they would be preferred from a safety perspective as long as the integrity of the open source software could be conveniently verified. Embodiments of the present invention can use a secure element within the device to link it to a management server responsible for the monitoring and update of the device and its software. Tampering with the device software, defined as modifications not signed by the management server can become evident to the device through corruption of the digital integrity check and are rejected. In addition to the secure update process, a device containing a secure element capable of signing a challenge from its management server can also be monitored for tampering or error. Upon such an exception, the parties responsible for the device can be notified and the party in control of the device can update the software. The device management system can allow a chain-of-custody to be maintained such that the vendor can transfer responsibility for the device to a licensed prescriber or even to the patient.

In one general aspect, the present invention can provide a system for the prescription of regulated medical devices that can be modified by the prescribing physician. In another general aspect, the present invention can provide a means for the secure update of a regulated medical device.

One implementation features a computer that includes connectivity to enable updates, a field-upgradable code storage medium, and a secure element. The secure element is capable of calculating a mathematical digest of code including field upgradable code, holding multiple public key certificates and verifying that the code digest has been signed by more than one key associated with the stored certificates prior to accepting an upgrade. In some embodiments of the invention, the secure element is also able to store a secret and use it to sign a challenge from an external service with which the device was previously registered.

One embodiment enables a vendor of a regulated medical device to share responsibility for modification of that device with a licensed prescriber, usually a physician. The vendor manufactures the device and offers it for sale with a prescription. Upon receipt of an acceptable physician certificate, the vendor configures the device by storing the vendor certificate and the prescriber certificate in the secure element prior to shipping. The device can now be shipped to either the physician or the patient.

The patient can now register the device for software updates with a service of his/her choice and that choice need not be the vendor of the device. The patient can register the device for software updates by the prescribing physician or by some other code provider. The verification method enforced by the secure element in the device ensures that any update to the code is signed either by the vendor or by the prescribing physician.

In another embodiment, the secure element allows the prescribing physician to unlock the device for the patient by adding the patient's certificate to the secure element. In a further embodiment, the secure element requires both the patient and the physician signature to enable a code update. In yet another embodiment, the secure element requires two of three signatures (vendor, prescriber, patient) to enable a code update.

In another general aspect, the present invention can enable a physician prescriber to create an app customized for a particular patient. Smartphones are sophisticated mobile phones upgradeable with apps selected by their owner. These apps can be installed from a service managed by the phone's vendor or, on a more limited basis, they can be provided and installed directly from an app developer. Apps installed through the vendor's service need to meet the vendor's policy requirements including regulatory requirements associated with a medical device. An app that is created or modified by the prescriber or the patient may be installed directly by the patient, bypassing the phone vendor's central distribution mechanism. A physician prescriber of an app can therefore create an app specific to the patient, transfer control of the app to the patient, and the patient can install the app on the smartphone bypassing many of the vendor's restrictions. This process, however is relatively complex for the patient and the physician as well because it bypasses core features of the smartphone vendor's App Store system.

Using the secure upgrade management system as described herein, the physician can retain control and responsibility for both the smartphone app and the medical device when the smartphone app serves merely a as a user interface and wide-area access relay for a patient's medical device configured according to the present invention.

In a preferred embodiment, the smartphone app is generic and undifferentiated at the prescriber or patient level. Regulatory compliance and security are managed by the device with the app serving only as a user interface and relay between the device and the device's management server. In some embodiments, the device also includes a secure private key that can be registered with one or more management servers. This enables the device to be monitored by the management server chosen by the patient and this monitoring can be separate from the phone app and phone management server that need not change at the same time as the device software is updated.

Systems according to the invention can allow a more flexible approach to customizing medical devices, in contrast to tight control by the vendor, which can discourage customization by licensed prescribers such as a physician and by open source software communities managed by the patients themselves.

Systems according to the invention can allow a sharing of responsibility between the device vendor and the prescribing physician and serve an important innovation function by allowing physicians to modify the use of the device for specific patients without notifying either the vendor or the regulator. Physician modification of the device is greatly facilitated by the use of open source software in the device and the availability of community support for the software. For example, communities of patients anywhere in the world can develop and provide support for an open source software modification for a regulated medical device and make it easy for a physician to take responsibility for updating the device to use the open source software independent of the device vendor or the regulatory agency.

DETAILED DESCRIPTION OF AN ILLUSTRATIVE EMBODIMENT

Figure 1:
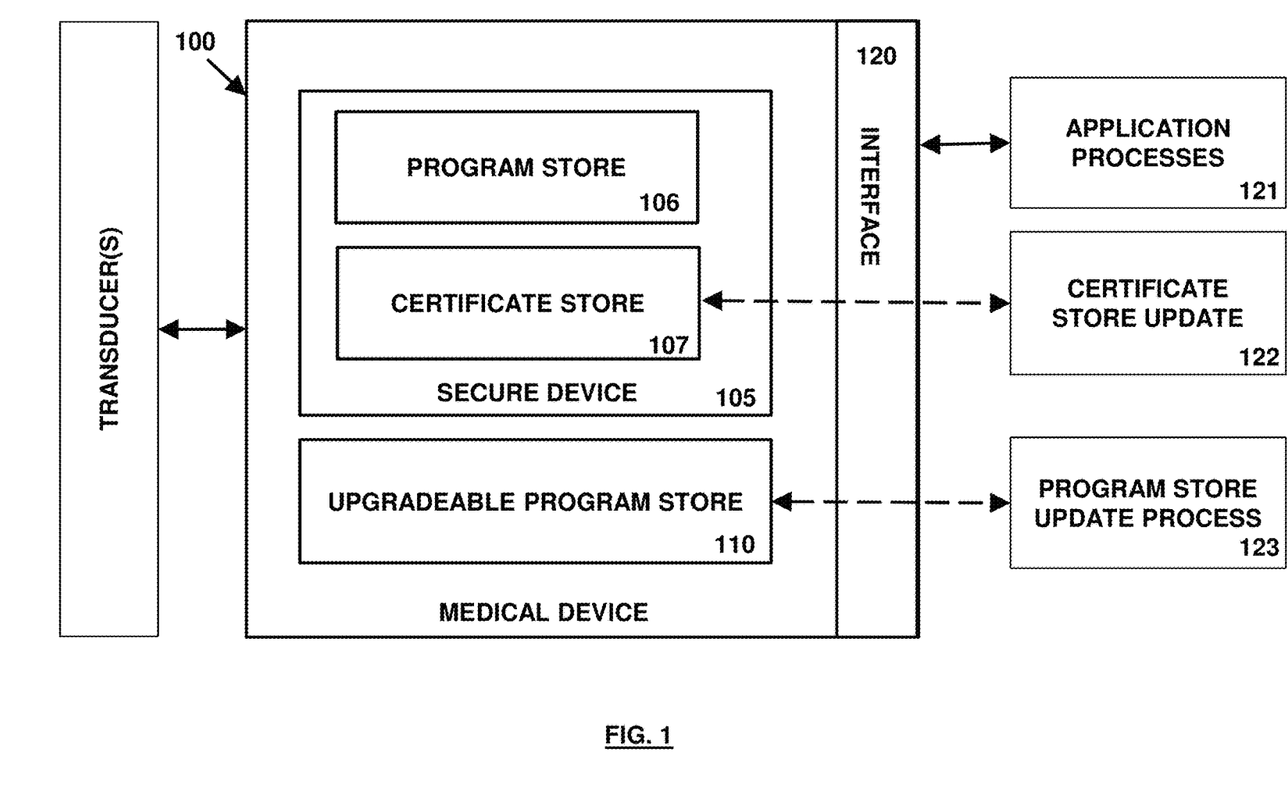
FIG. 1 is a block diagram of a medical device according to the invention.

Referring to FIG. 1, a medical device 100 is implemented with a computer that is connected to one or more transducers (i.e., sensors and/or effectors). The computer includes a secure element 105 and an upgradeable program store 110. It also has sensors, effectors, and user interfaces as required for its particular application. Examples of applications include regulating the delivery of glucose through a glucose pump or controlling cardiac rhythm through a defibrillator.

Secure element 105 has a fixed program store 106 and a dedicated certificate store 107. It communicates via interface 120. This interface 120 serves application processes 121, certificate store update process 122, and upgradeable program store update process 123. The certificate store update process 122 is under the exclusive control of the secure element program store 106. The program store update process 123 is under the control of the secure element program store 106.

Figure 2A:
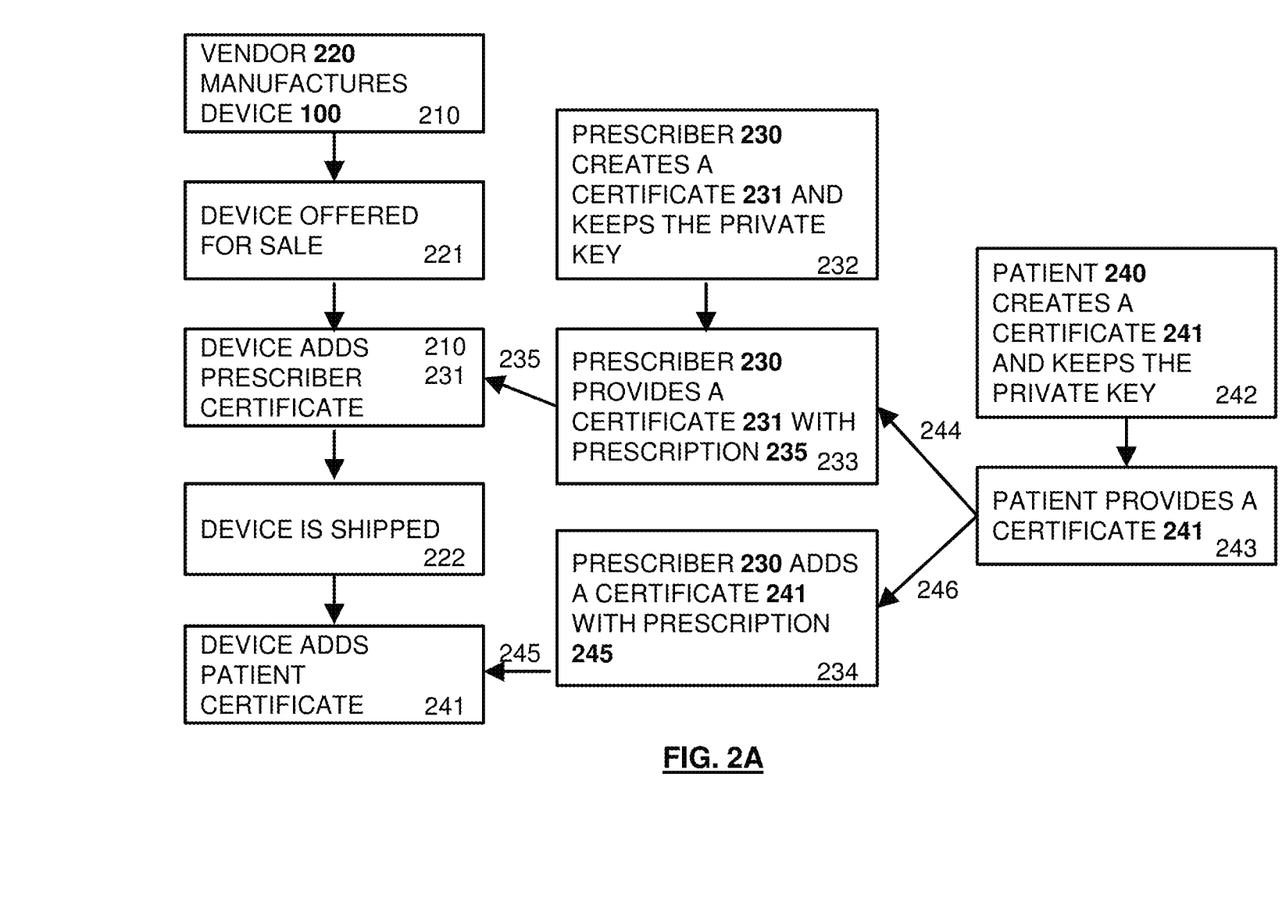
FIG. 2A is a first part of a flowchart of a deployment process for the medical device of FIG. 1.
Figure 2B:
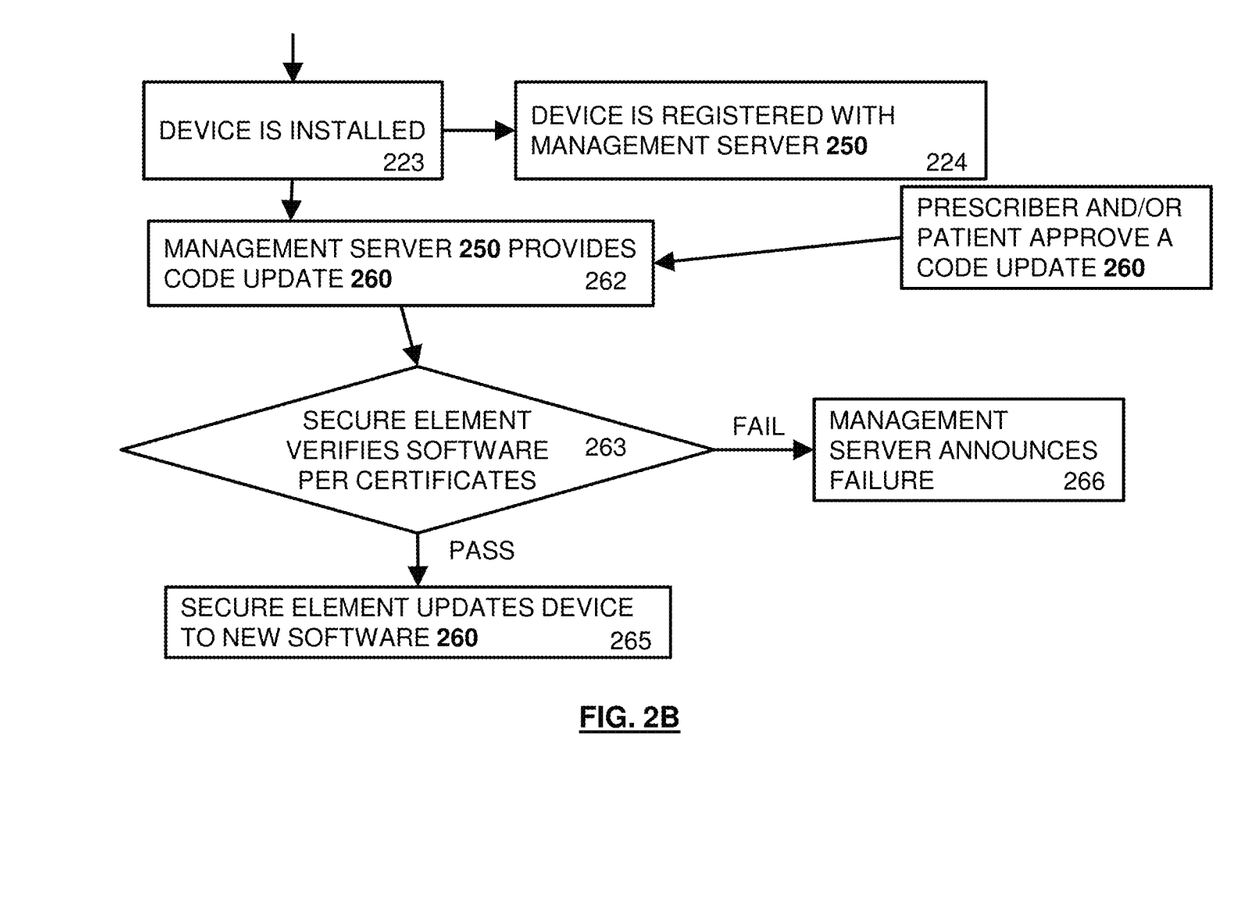
FIG. 2B is a second part of the flowchart of FIG. 2A.

FIG. 2 shows the deployment process for a particular instance of a medical device 100. It's computer (FIG. 1) is manufactured with a secure certificate (step 210) corresponding to the private key of the manufacturer or the vendor (step 220). The vendor 220 receives a prescription (step 235) from prescriber 230. The prescription 230 includes the certificate 231 corresponding to the private key of the prescriber. The prescription may also include certificate 241 corresponding to the private key of the patient 240. The vendor 220 adds the certificates 231 (and 241 if available) to the certificate store of the computer prior to delivery.

Prescriber 230 uses his or her private key to sign a code update 260 for program store 110 of the medical device via update process 123. Secure Element 105 verifies the prescriber's signature using certificate 231 to complete the update. Device 100 updated with certificates 231 and, if available, 241 is registered with a management server 250.

Depending on the regulatory requirements associated with the marketing of device 100, the code update process 262 could require that code update 260 be signed by any combination of the vendor 220, the prescriber 230, and the patient 240 in order to pass verification step 263. The combination could include signatures by two of the three. Depending on the market requirements, the secure element 105 of device 100 could be configured to allow the prescriber 230 or even the patient 250 to add or remove certificates from secure certificate store 107 thereby effectively transferring control of device 100 to another vendor, another prescriber, or another patient.

Figure 3:
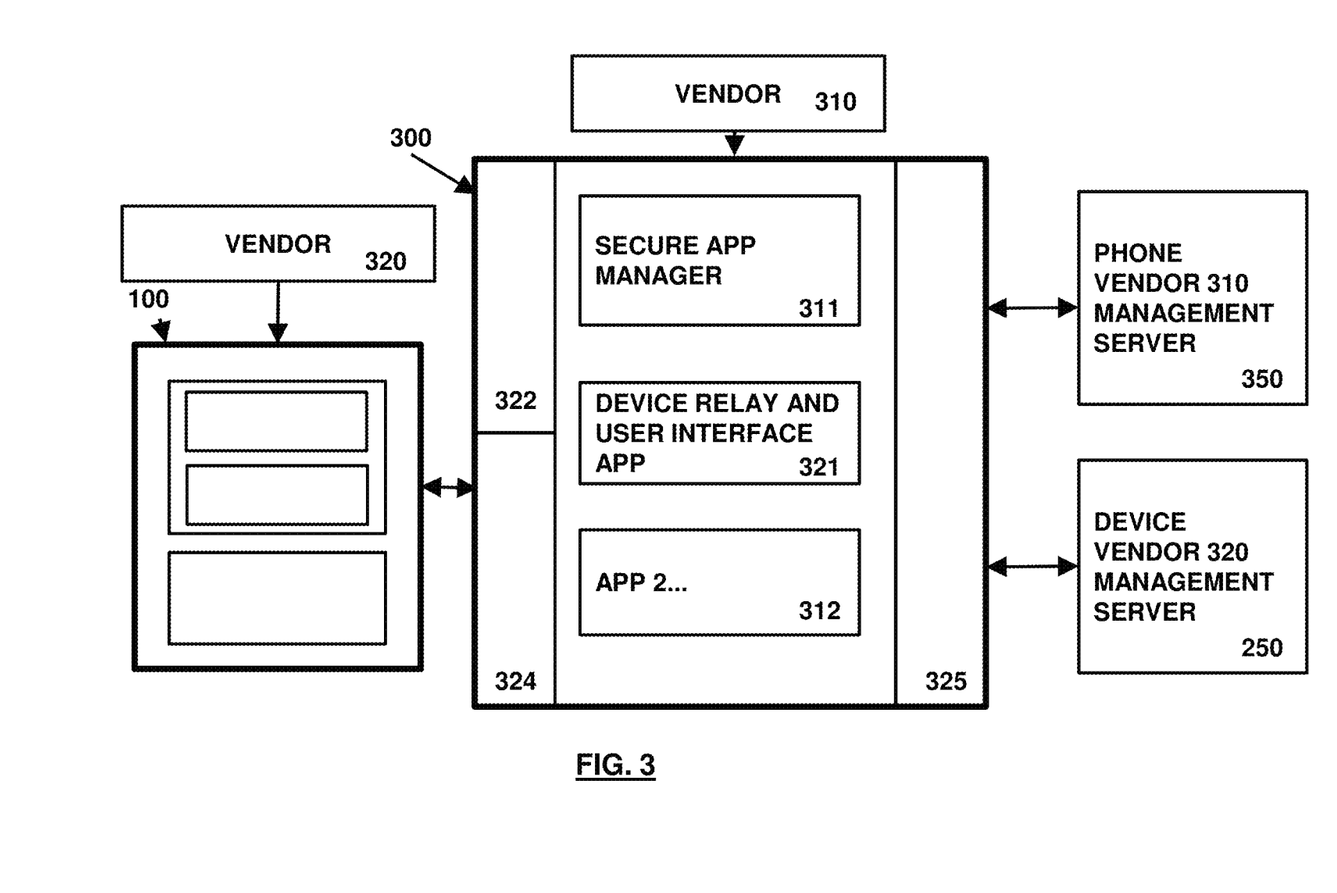
FIG. 3 is a block diagram of a system incorporating the medical device of FIG. 1.

Referring to FIG. 3, computer 300 is a smartphone marketed and managed by vendor 310 operating a code update service 350 known as an app store. Vendor 320 is subject to regulation different from vendor 310 such as FDA pre-market approvals. Vendor 310 allows vendor 320 to install app 321 as a relay for the vendor's device management service 325. App 321 provides communication services 324 to device 100 as well as a user interface 322. App 321 can be independent of the specific configuration associated with device 100, the particular prescriber 230 or patient 250. Regulated processes of device 100 use app 321 as a pass through and a user interface. Under these constraints, vendor 310 may avoid strict regulation applicable to vendor 320.

Figure 4:
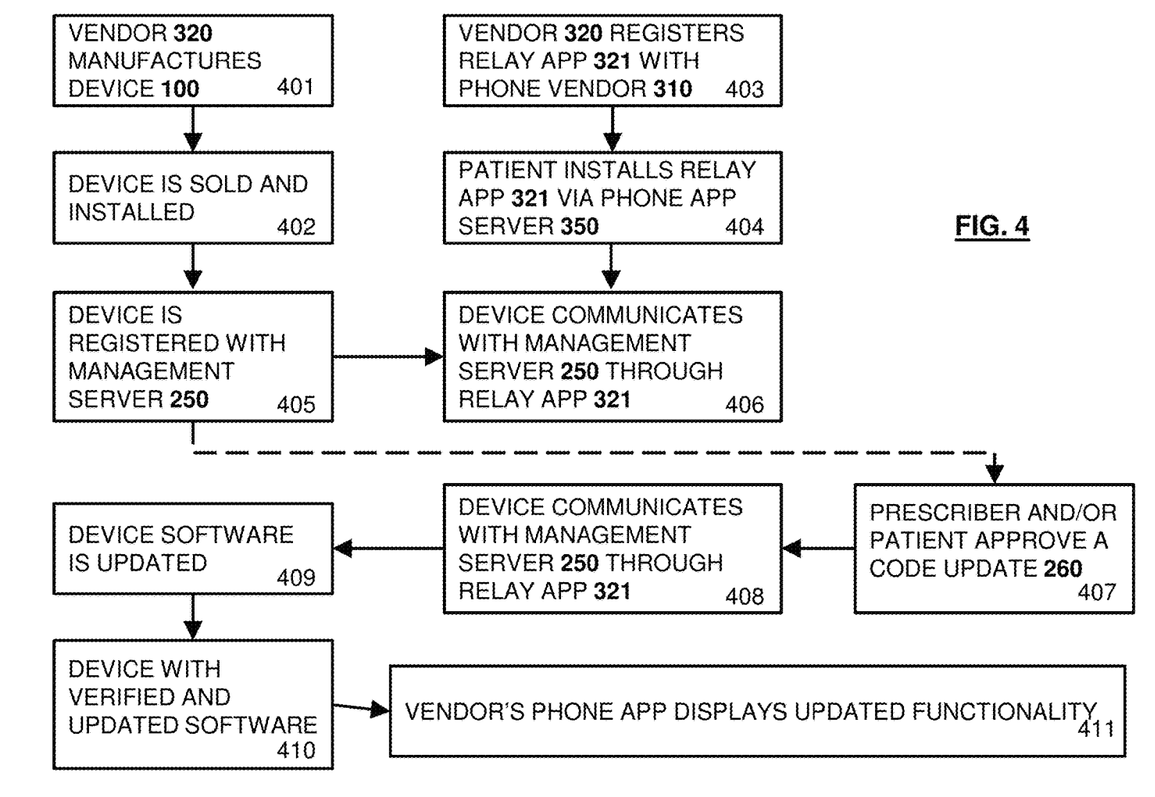
FIG. 4 is a first flowchart illustrating operation of the system of FIG. 3.

Referring to FIG. 4, in step 401, vendor 320 (FIG. 3) manufactures device 100 (FIG. 1) and also registers a companion relay app 321 with phone vendor 310 as step 403. In step 402, the device 100 is now sold and installed according to the applicable regulations. In step 404, the patient with device 100 installs relay app 321 on their phone 300 (FIG. 3) using the normal procedure supported by vendor 310. In step 405, the relay app 321 now enables communication with device management server 250 (FIG. 2). Server 250 can be operated by the device vendor, the prescriber, or a third party as allowed by the policies of the vendor and/or under the control of the prescriber. In step 406, the relay app is in communication with the management server 250 and ready for updates.

At some time after registration, in step 407, the provider and/or the patient approve a code update 260 (FIG. 2) for device 100 as sold and installed for this particular patient. In step 408, the relay app 321 communicates the update to device 100 which receives the update as step 409. Device 100 verifies the software update according to process 263 (FIG. 2) as step 410. Step 411 represents the vendor's phone app now displaying updated functionality.

Figure 5:
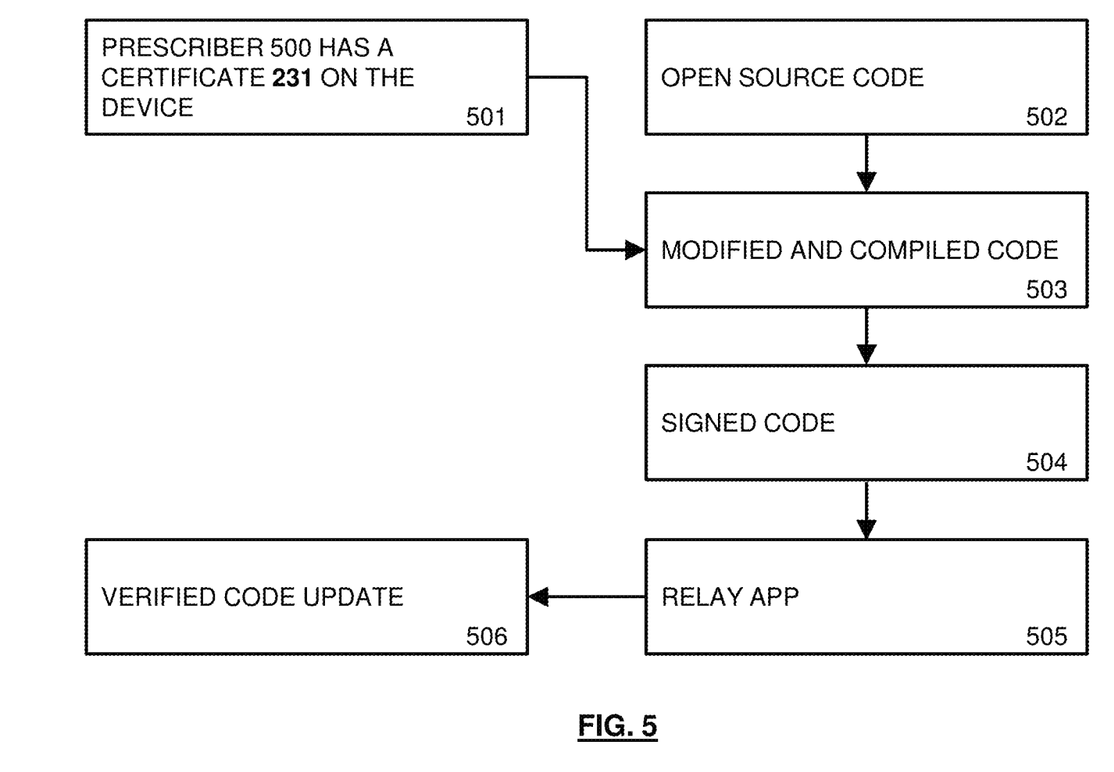
FIG. 5 is a flowchart illustrating open-source updating for the system of FIG. 3.

Referring to FIG. 5, with open source software the goal is to enable the owner to control all of the essential features and functions of a device. In the case of device 100, this means control of as much of the behavior as allowed by the device manufacturer through code updates as well as the choice of device management server. Prescriber 500 has been granted ownership of device 100 through the inclusion of their certificate 231 (FIG. 2). Computer Program 503 is compiled from open source code 502 by prescriber 500. The patient 250 (FIG. 2) could also do this depending on whether their certificate is in the device or the device update policy requires co-signing by the prescriber, the vendor, or other combinations. Code 504 is signed with the private key(s) of prescriber 500 and/or patient 250.

The prescriber and other responsible parties may have their own copy of device 100 and access to code management server 250 to use for testing the code and device combination before signing and releasing the update. Such capability is provided by GitHub and well known to those skilled in the art. In step 505, code 504 is communicated to device 100 via relay app 321 connected to device management service 325 or directly using program update process 123. In step 506, code is verified according to secure element process 105 (FIG. 1). If the digital signature(s) on program 504 correspond to certificates in store 107, the update is accepted. Regulatory responsibility for program 503 on device 100 can rest with the vendor 320 at the time device 100 is sold, with the prescriber 230 at the time when upgrade 506 is made under the prescriber's signature. Prescriber 500 can also transfer responsibility to patent 250 for the code update process.

Figure 6:
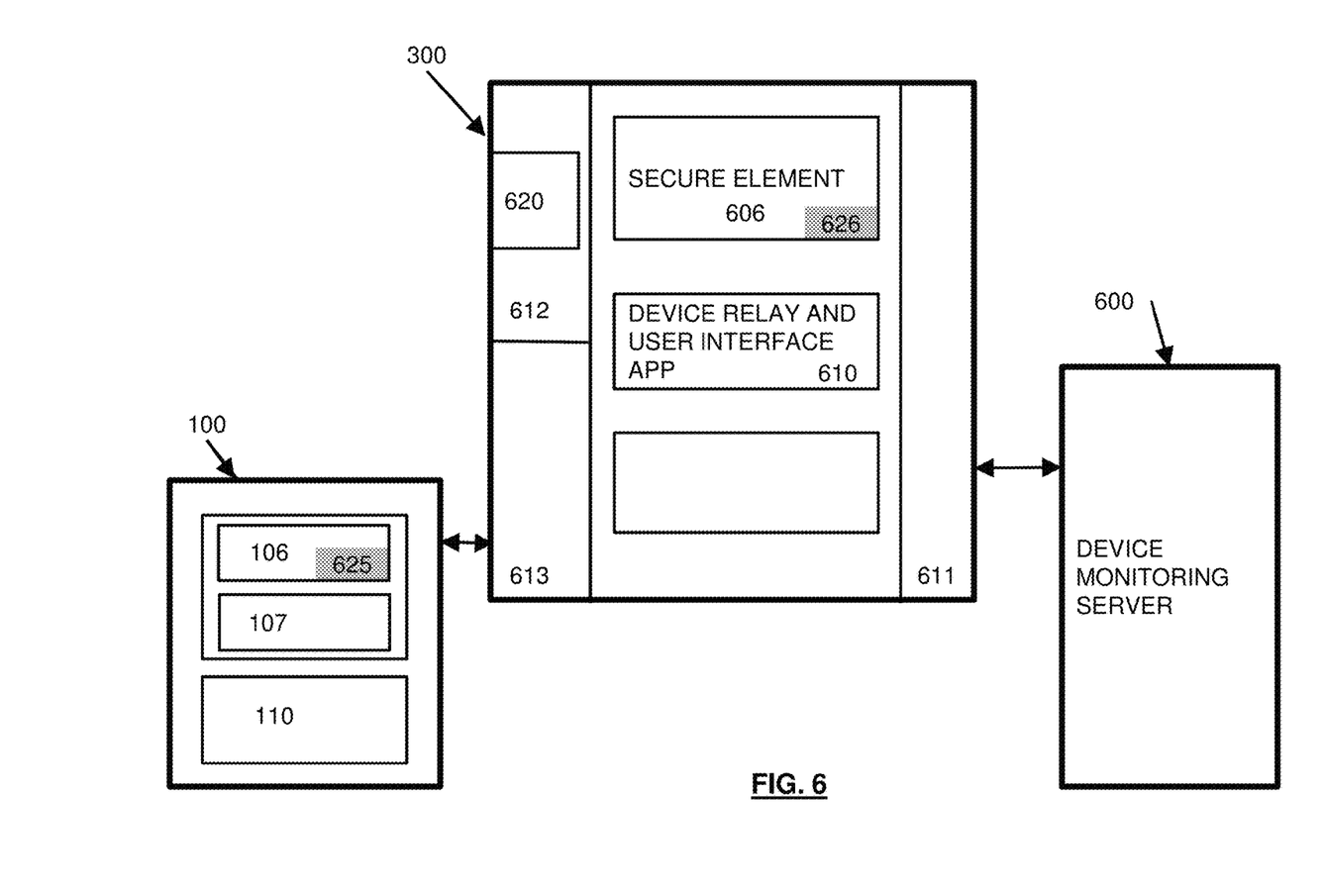
FIG. 6 is a block diagram of another system incorporating the medical device of FIG. 1.

Referring to FIG. 6, the computer in the device 100 can be securely monitored by a service 600 designated by authorized users. The address of monitoring service 600 is updated in the program store 110. The computer uses a local pseudorandom private key 625 in secure element 106 (FIG. 1) to register itself with service 600. Service 600 may also use the certificates in store 107 as part of the trust chain for validating the registration process. Connection between the device 100 and monitoring service 600 can be direct or relayed via the smartphone app 610 using network interface 611 and local device interface 613.

In some embodiments, the security of this registration process requires authentication of the presence and intent of the patient or the authorized user. As is sometimes the case with low cost or implanted devices, there is no user interface to conveniently support the authentication process. It is therefore advantageous for the phone app 610 to use interface 612 as part of the device registration process for user authentication and to display security-enhancing messages related to device monitoring server 600.

In some embodiments, secure element 606 is in control of the user interface 612 for authentication services such as a fingerprint sensor 620. The overall security and integrity of the device registration process depends on tight binding between the actions of secure element 106 with its private key 625 and secure element 606 with its private key 626. Typically, authentication interface 620 is tightly bound to the use of private key 626 via secure element 606. The outcome of this binding (such as signing a challenge issued by monitoring server 600 or device 100 according to standards such as FIDO) is available to phone app 610 acting as relay. In a preferred embodiment of the current invention, phone 300 is used to sign a challenge issued by code in device 100 which is then used to sign a challenge from server 600 as part of the registration or subsequent authentication process. In this preferred embodiment, the relay app 610 itself is generic, possibly compiled and installed by the patient from open source code, and this app 610 has no direct access to the secure elements 106 or 606. As such, app 610 is merely acting as a router component of a network that spans local device interface via low-power technology such as Bluetooth Smart and higher power wide area network technology such as the cellular network.

The system described above has been implemented in connection with special-purpose software programs on general-purpose platforms, such as a smartphone, but it could also be implemented with similar logic functionality embodied in whole or in part in special-purpose hardware. And while the system can be broken into the series of modules and steps shown for illustration purposes, one of ordinary skill in the art would recognize that it is also possible to combine them and/or split them differently to achieve a different breakdown, and that the functions of such modules and steps can be arbitrarily distributed and intermingled within different entities, such as differently housed machines, differently aggregated modules, or differently designed parts.

The present invention has now been described in connection with a number of specific embodiments thereof. However, numerous modifications, which are contemplated as falling within the scope of the present invention, should now be apparent to those skilled in the art. For example, there is room for significant variation in the capabilities of the secure elements of the device and the phone as well as significant variation in how apps are securely distributed to phones and how these apps are able to access the secure elements. This kind of variation is also the subject of current standards such as FIDO, OAuth2, OpenID Connect, and UMA as well as well known open source services such as GitHub, and at least some versions of these standards are presumed as prior art by the present invention and incorporated by reference. There is also room for significant variation in the construction of device 100, for example it could include user authentication capabilities such as an accelerometer under control of its secure element and other capabilities related to the security and manageability of the overall system. It is therefore intended that the scope of the present invention be limited only by the scope of the claims appended hereto. In addition, the order of the claims should not be considered to limit the scope of any particular term in the claim.

What is claimed is:

1. A method of maintaining electronic access to a medical device, comprising:
   storing an application in code storage for the medical device,
   storing one or more custodian certificates in certificate storage for the medical device,
   receiving a signed request to update code for the application stored in the code storage for the medical device,
   authenticating the signed update request with at least one of the stored custodian certificates,
   adding a further custodian certificate to the certificate storage for the medical device,
   authenticating the further custodian certificate based on at least one of the stored custodian certificates,
   receiving an additional signed request to update code for the application stored in the code storage for the medical device, and
   authenticating the additional signed update request with at least the added authenticated custodian certificate.

2. The method of claim 1 wherein the storing of one or more custodian certificates stores a vendor certificate and wherein the adding and authenticating a further custodian certificate adds and authenticates a licensed prescriber certificate.

3. The method of claim 2 further including adding a patient certificate to the certificate storage for the medical device and authenticating the patient certificate based on at least the licensed prescriber certificate.

4. The method of claim 1 wherein the storing of one or more custodian certificates stores a vendor certificate and wherein the adding and authenticating a further custodian certificate adds and authenticates a patient certificate.

5. The method of claim 1 further including deleting at least one of the custodian certificates that were stored in the step of storing.

6. The method of claim 1 wherein the storing of one or more custodian certificates in certificate storage for the medical device includes storing at least a first vendor certificate and a patient certificate and wherein the adding and authenticating a further custodian certificate adds a second vendor certificate.

7. The method of claim 6 further including deleting the first vendor certificate after the steps of adding and authenticating a second vendor certificate.

8. The method of claim 1 wherein the storing of one or more custodian certificates in certificate storage for the medical device includes storing at least a first licensed prescriber certificate and a patient certificate and wherein the adding and authenticating a further custodian certificate adds a second licensed prescriber certificate.

9. The method of claim 1 further including deleting the first licensed prescriber certificate after the steps of adding and authenticating a second licensing prescriber certificate.

10. The method of claim 1 wherein the steps of authenticating are each based on two or more of the stored certificates.

11. The method of claim 1 wherein the steps of storing and updating store and update open-source code.

12. The method of claim 1 wherein the medical device includes a computer.

13. The method of claim 12 wherein the medical device includes a transducer.

14. The method of claim 1 wherein the steps of receiving a signed request to update code in the medical device receives an update from a registered update service.

* * * * *